Feb. 6, 1951  J. F. O'BRIEN ET AL  2,540,135
ELECTRORESPONSIVE DEVICE WITH TIME DELAY

Filed Dec. 20, 1947  3 Sheets-Sheet 1

INVENTORS
JOSEPH F. O'BRIEN
EMIL PODHORZER
BY Lucke + Lucke
AGENTS

Feb. 6, 1951 J. F. O'BRIEN ET AL 2,540,135
ELECTRORESPONSIVE DEVICE WITH TIME DELAY
Filed Dec. 20, 1947 3 Sheets-Sheet 2
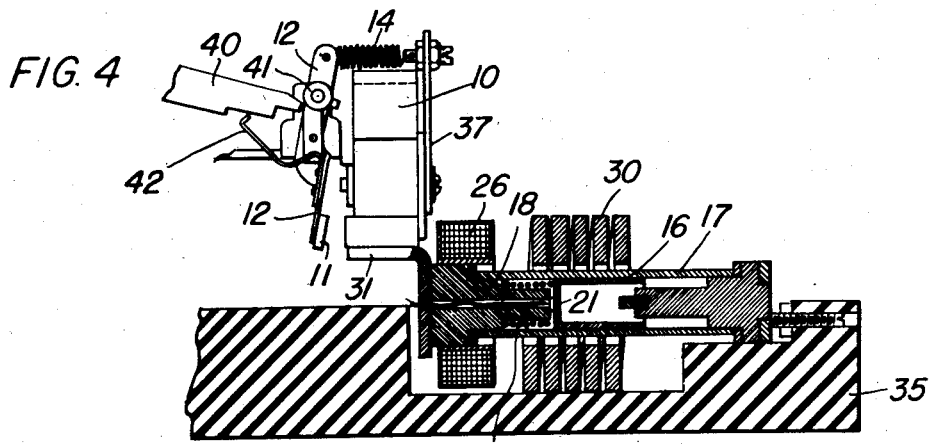
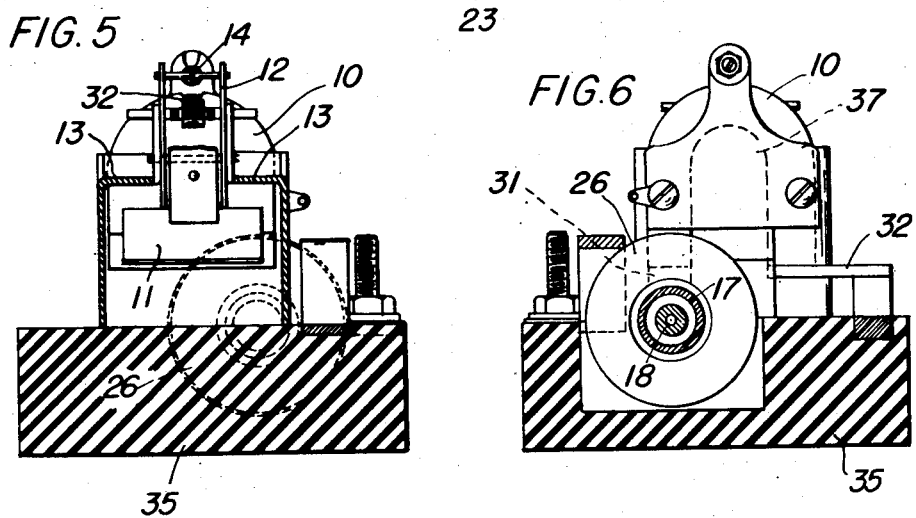
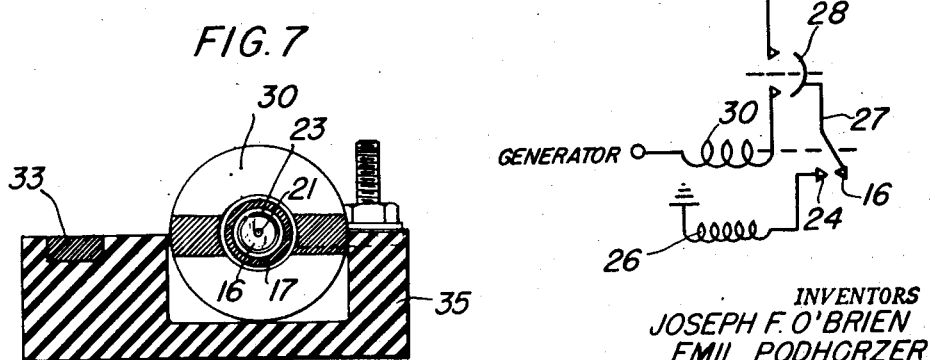
INVENTORS
JOSEPH F. O'BRIEN
EMIL PODHORZER
By Lucke & Lucke
AGENTS Feb. 6, 1951   J. F. O'BRIEN ET AL   2,540,135
ELECTRORESPONSIVE DEVICE WITH TIME DELAY
Filed Dec. 20, 1947   3 Sheets-Sheet 3

INVENTORS
JOSEPH F. O'BRIEN
EMIL PODHORZER
BY
AGENTS

Patented Feb. 6, 1951

2,540,135

UNITED STATES PATENT OFFICE 2,540,135

ELECTRORESPONSIVE DEVICE WITH TIME DELAY

Joseph F. O'Brien, Lebanon, and Emil Podhorzer, Somerville, N. J., assignors to John B. Pierce Foundation, New York, N. Y., a corporation of New York Application December 20, 1947, Serial No. 793,037

6 Claims. (Cl. 200—98)

This invention relates to electrical devices which are responsive to change of some normal operative condition in electrical circuits wherein they are connected, for the purpose of bringing about actions directed by such change in condition. More particularly the invention relates to electrical devices of this type as arranged for delayed response, to a predetermined extent.

Such devices have many uses. Often they are employed as, or in conjunction with, electrical circuit breakers.

The device of the invention is adapted for general use, but is outstanding in that it is especially well suited for use in aircraft, where lightness in weight, compactness in size, positiveness of action under all conditions of operation of the aircraft, and ruggedness of construction so as to be able to withstand excessive vibration over long periods of time as well as sudden violent shocks, are prime essentials.

In the electrical systems of many types of aircraft it is customary to utilize a so-called reverse-current relay for opening the electrical circuit connecting generator with storage battery whenever there is any reverse flow of current from battery to generator. Since, however, there is danger that under faulty conditions the reverse-current may be so high as to weld the contacts of the relay, and so prevent its opening, it is necessary to provide a supplemental circuit-breaker operable on high amperage reverse-current flow. The device of the invention is ideal for this purpose, and is here illustrated and described primarily as so embodied.

A main object of the invention is to produce a device of this character which will act instantly at excessively high amperage currents, but whose action may be delayed sufficiently long at lower amperage currents to give the reverse-current relay ample opportunity to function, thereby preventing nuisance operation of the circuit breaker.

An object is to produce such a device whose delayed action may be timed as required for any given need, and one not subject to reduction of its normal time-delay due to sudden current reversals such as arise in the event of an unstable electrical system.

A further object is to provide an improved electro-responsive device with time delay for general application.

Pursuant to the invention the device embodies a magnetic circuit, which includes a permanent magnetic portion and an electromagnetic portion, the latter being energized by current flowing through the electrical circuit in which the device is connected. The electromagnetic portion of the magnetic circuit is broken by an air-gap which is arranged to be closed by time-delay mechanism. Such time-delay mechanism advantageously takes the form of a retarded-action plunger upon which the magnetic flux engendered by the flowing current is directly operable to render it, in effect, the movable part of a solenoid. The plunger is conveniently so arranged as to close an electric circuit at the same time that it closes the air-gap, thereby bringing into operation an auxiliary coil effective to so augment the magnetic flux of the electromagnetic portion of the magnetic circuit as to render the permanent magnetic portion of the circuit impotent in its effect on a magnet shorting bar or clapper. Such auxiliary coil is not a necessity, as will appear hereinafter, but is advantageous as it simplifies design of the time-delay mechanism.

The magnet shorting bar or clapper is the key element of the device, because the end result is determined by whether or not that element is tightly held by the magnetic flux of the permanent magnetic portion of the circuit. It is arranged so as to be normally held against the poles of the permanent magnet by reason of the inherent magnetic flux thereof. Thus, the permanent magnet and the shorting bar establish a closed local magnetic circuit. However, when electromagnetic portion of the larger circuit is suitably energized, the magnetic flux of the permanent magnet is routed therethrough. This is true because the electromagnetic portion of the larger magnetic circuit becomes, in effect, a lower reluctance path than the shorting bar, and the shorting bar is accordingly released. The manner in which this release of the magnet shorting bar is utilized depends upon the particular application of the device.

In instances of excessively high current values, the magnetic flux caused thereby is sufficiently strong in itself to accomplish the desired end result immediately by bridging the air-gap, without awaiting operation of the time-delay mechanism. Accordingly, by appropriately designing the component parts, the device may be adapted to operate with time-delay within a given range of current values, and to operate instantly for all current values above that range.

When the device is arranged to operate on reverse current flow, a polarizing magnet is included in the electromagnetic portion of the magnetic circuit for neutralizing the magnetic flux due to forward current flow, thereby preventing movement of the time-delay plunger under normal circuit conditions. However, when reverse flow of current is not a factor in the operation of the device, for instance under circumstances of use of the device as a time-delay switch or as an ordinary overload circuit breaker, a polarizing magnet is not provided.

Further objects and features of the invention will become apparent as the description proceeds.

In the drawings:

Fig. 4 is a similar view, but illustrating the plunger in thrown position, closing the air-gap and also closing the electrical circuit which energizes the auxiliary coil;

Fig. 5 is an end elevation, partly in section, of the same apparatus viewed from the left in Fig. 1;

Fig. 6 is a transverse vertical section taken on the line 6—6, Fig. 3;

Fig. 7 is a similar section taken on the line 7—7, Fig. 3;

Fig. 8 is a wiring diagram of the complete installation, including the circuit breaker;

Figure 1:
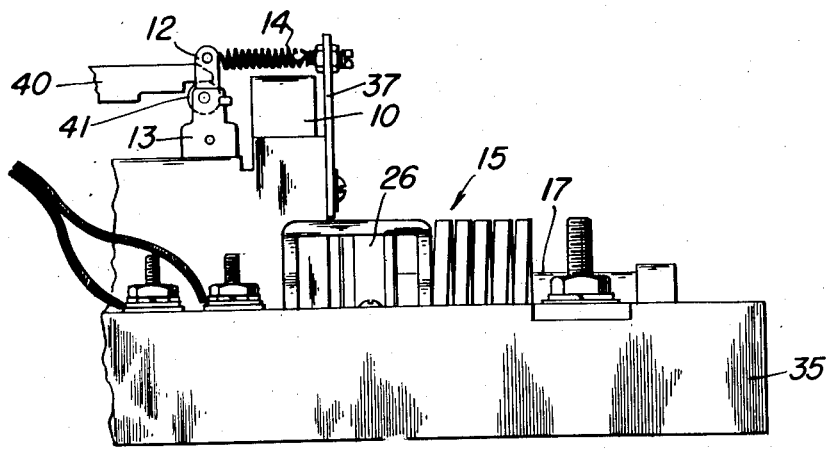
Fig. 1 illustrates, in side elevation, a preferred embodiment of the invention as used in conjunction with an electrical circuit breaker in generator-battery circuits of aircraft.
Figure 2:
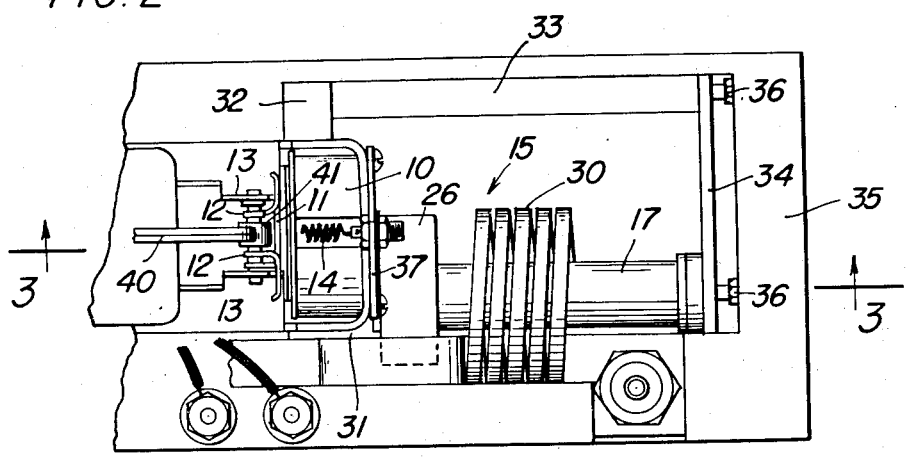
Fig. 2 is a top plan view of the same embodiment.

Referring now to the drawings, and particularly to Figs. 1 through 10 thereof, the invention is illustrated as embodied in a reverse-current responsive device coupled to a circuit breaker by latching mechanism of the type disclosed in the copending application of Joseph F. O'Brien and John B. Cataldo, Serial No. 594,396, filed May 18, 1945, now abandoned, and entitled "Reverse Current Circuit Breaker." Such latching mechanism constitutes trip mechanism operated by the magnetic circuit of the device.

The magnetic circuit of the illustrated embodiment includes a permanent magnet 10 of the horse-shoe type and an electromagnetic arrangement associated therewith.

A shorting bar or armature 11 is arranged across the poles of magnet 10, being attached to the lower end of a non-magnetic trip arm 12 of the latch mechanism. Such trip arm is pivoted in a frame 13 so as to swing the shorting bar 11 toward and away from the magnet 10, the effective magnetic flux of which is normally sufficiently strong to tightly hold shorting bar 11 thereagainst despite the opposition of retractile spring 14 acting on the trip arm. The spring 14 is set in tension to overcome a predetermined magnetic pull on the shorting bar 11.

Included in the electromagnetic portion of the magnetic circuit is time-delay mechanism, indicated generally 15. As illustrated, this mechanism is of retarded action type, here comprising a plunger 16, Fig. 3, mounted for back and forth sliding movement within a cylinder 17. Pole pieces 18 and 19 of soft iron or other suitable magnetic material are positioned at respective open ends of the cylinder 17, preferably extending therewithin and serving, by reason of interposed gaskets 20, to cap such ends and seal the cylinder casing fluid-tight. This sealing feature is necessary, however, only when the device is designed for operation at high altitudes or when a fluid other than air is utilized.

The plunger 16, disposed between the spaced pole pieces 18 and 19, is preferably cup-shaped and is also of soft iron or other suitable magnetic material. The plunger is telescopically fitted to the pole piece 19, and has a length greater than the length of the gap between the pole pieces 18 and 19. See Figs. 3 and 4. It may be suitably perforated, as at 21, Fig. 7, to provide restricted flow passage for fluid, preferably air, confined within the cylinder. The restricted flow passage may also be provided by making a loose fit of the plunger within the cylinder, or by a combination of perforation and loose fit.

The pole piece 19 has a pin 22 of brass or other suitable non-magnetic material carried by its inner end, and the plunger 16 is normally held thereagainst by a spring 23. The opposite pole piece 18 carries at its inner end an electrical contact 24, which is connected, as by wiring 25, to an auxiliary electric coil 26 encircling the pole piece 18.

The plunger 16, which serves as a movable electrical contact for make and break with the contact 24, is electrically connected in the circuit which energizes auxiliary coil 26. Here, the auxiliary coil 26 is connected through the circuit breaker into the main line between generator and battery for energization, see Fig. 8, the cylinder casing 17 being electrically conductive and connected by suitable wiring 27 to the shorting bar 28 of the circuit breaker.

For actuating the time-delay mechanism, a series turn is disposed in the main line between generator and battery, being suitably positioned with respect to said mechanism. The series turn 30 encircles the cylinder 17 between the two poles pieces 18 and 19, providing, in effect, a solenoid arrangement in which the plunger 16 is the movable element.

Figure 3:
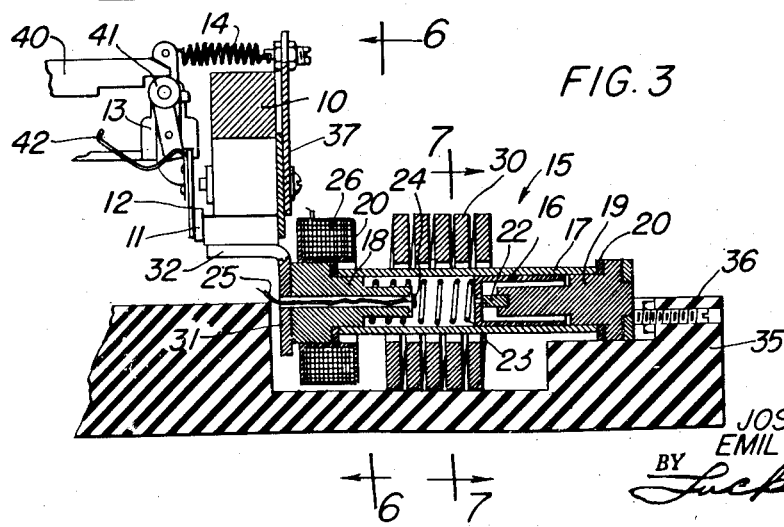
Fig. 3 is a longitudinal vertical section taken on the line 3—3, Fig. 2, illustrating the time-delay plunger in normal retracted position whereby an air-gap breaks the magnetic circuit.

At zero current or upon reverse current flow of less than the predetermined ultimate trip current valve, the plunger 16 is held in the retracted position of Fig. 3 by the spring 23. At reverse currents higher than the said ultimate trip current valve, the plunger 16 is moved against the force of spring 23 to close the air gap between it and the pole piece 18, thereby making contact with the electrical contact 24 and bringing the auxiliary coil 26 into operation as an auxiliary to the series turn. The movement of plunger 16 is, however, retarded by the necessity of fluid displacement from front to rear through the restrictive fluid-flow passage 21 and/or between plunger and cylinder wall, thereby introducing the timing factor. This timing factor may be adjusted to fit a variety of installations and current values by suitable selection of size of passage 21, closeness of fit of plunger 16 within its cylinder, and strength of spring 23.

Figure 9:
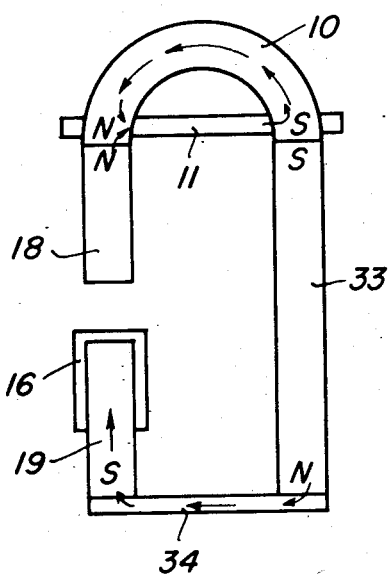
Fig. 9 is a diagrammatic showing of the magnetic circuit under normal forward flow of current from generator to storage battery.
Figure 10:
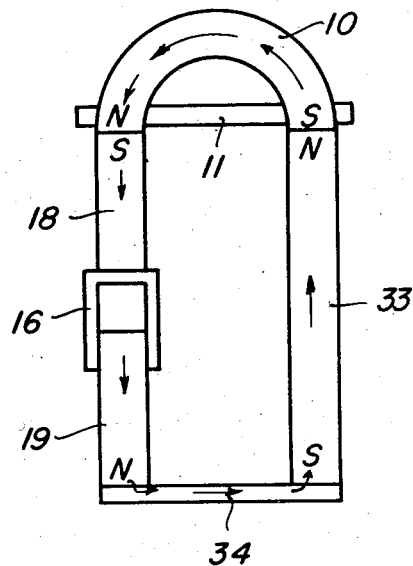
Fig. 10 is a similar diagrammatic showing under conditions of reverse flow of current from storage battery to generator.

The magnetic circuit includes components additional to the permanent magnet 10 and the electromagnetic time-delay mechanism above-described, such additional components serving to establish a complete magnetic loop unbroken except by the plunger-controlled air gap of the time-delay mechanism, see Figs. 9 and 10. In the illustrated instance such components take the form of spaced brackets 31 and 32 of soft iron or other suitable magnetic material upon which the permanent magnet 10 is mounted, the bracket 31 being fixed to the pole piece 18 of the time-delay mechanism, and the bracket 32 to one end of a bar magnet component 33 which lies in spaced, parallel relation to the electromagnetic time-delay mechanism. A spacer component 34 of magnetic material magnetically links bar magnet 33 with the pole piece 19 of the time-delay mechanism, see Fig. 2.

The operative elements of the device are advantageously mounted on an insulating base 35, which is suitably recessed for the purpose as illustrated. Set screws 36 may be provided to insure proper adjusted position of the magnetic circuit structure relative to the latching mechanism, it being expedient to anchor the retractile spring 14 to a standard 37 adjustably secured to permanent magnet 10, see Fig. 3.

As aforestated, the illustrated device is arranged for response to reverse current flow from battery to generator. As such, the polarizing bar magnet 33 is selected of strength adequate to counteract the magnetic effect of the series turn 30 under conditions of forward current flow in the main line from generator to battery, whereby forwardly flowing current passing through the series turn will be ineffective to operate the device.

Under conditions of trip value reverse current flow through the series turn 30, however, the magnetic flux thereby engendered will act to move plunger 16 to close the air gap between pole pieces 18 and 19, the time involved in closure of such gap being determined by the time-delay characteristics of the plunger-cylinder arrangement and the strength of the magnetic flux.

In the operation of the device, therefore, forwardly flowing current from generator to battery in the main line will produce no effect. However, upon the occurrence of trip value reverse current flow from battery to generator in the main line, plunger 16 will close the air gap between pole pieces 18 and 19 with a predetermined time-delay, and also, at the end of its stroke, will close the energizing circuit of auxiliary coil 26 to augment the magnetic flux of the series turn 30 by the additional flux engendered by the auxiliary coil.

Energization of the series turn decreases the magnetic gradient of the electromagnetic portion of the circuit, thereby, in effect, lowering the magnetic reluctance thereof so that flux from the permanent magnetic portion of the circuit, as represented by permanent magnet 10, is increasingly by-passed through such electromagnetic portion. The auxiliary coil is so calibrated that the additional flux engendered thereby further decreases the magnetic gradient to an extent whereby sufficient flux of permanent magnet 10 is by-passed to release the attractive influence of such magnet 10 on the shorting bar or armature 11. Accordingly, the retractile spring 14 becomes capable of and does actuate trip-arm 12 to swing such shorting bar or armature away from the permanent magnet 10. This means that the lever 40 controlling the circuit breaker, resting in latched position as it does on latching roller 41 carried by the trip-arm 12, will be unlatched and will drop, see Fig. 4, thereby breaking the main circuit, see Fig. 8, whereupon series turn 30 and auxiliary coil 26 will be de-energized, causing plunger 16 to be returned to its normal position adjacent pole piece 19 and re-establishing the air gap.

In its downward movement the lever 40 engages spring bumper arm 42, so that at the termination of its downward stroke it has actuated trip-arm 12 to re-position shorting bar 11 against the poles of permanent magnet 10. Once re-positioned in this manner, shorting bar 11 is tightly held against the poles of permanent magnet 10 by the inherent magnetic flux thereof, and such position is maintained after re-setting of the circuit breaker.

Re-setting of the circuit breaker, so that lever 32 is again latched by the trip mechanism, as in Fig. 3, closes the main circuit and causes current to flow once more in the normal forward direction through series turn 30. It should be noted that the magnetic flux engendered by such forward flow of current through the series turn, counteracted as it is by the opposing flux of polarizing bar magnet 33, actually augments the normal flux of permanent magnet 10, and thus causes magnet shorting bar 11 to be even more tightly held in its normal position against the poles of the permanent magnet.

The device is calibrated to suit the requirements of the particular use. In the present instance the polarizing bar magnet 33 is given such strength as will prevent air-gap closing movement of the time-delay plunger on forward current values up to a given maximum, for instance up to 175 per cent of rated load, thereby preventing a reduction in time-delay, and consequent nuisance operation of the device, under conditions of rapid current reversals occurring in the event of an unstable system. A time delay of .03 second at 530 amperes has been found sufficiently long to prevent nuisance trip operations in an aircraft electrical system using 200 ampere generators. It should be noted that the rapid current reversals referred to are such as do not consume time periods as long as the inherent time-delay of the device. Furthermore, the strength of polarizing magnet 33 is preferably such as to preclude operation of the device at any value of forward current.

Otherwise the calibration of the device is such that flow through the series turn of reverse current of relatively low amperage will actuate the plunger 16 to bring into operation the auxiliary coil 26 all as afore-explained, but, upon flow through the series turn of reverse current of relatively high amperage, sufficient magnetic flux will be developed to, in effect, sufficiently lower the reluctance of the electromagnetic portion of the magnetic circuit to accomplish the desired end result of by-passing the magnetic flux of permanent magnet 10 from magnet shorting bar or clapper 11 without the need of closure of the air-gap by the plunger 16 nor of the additional flux generated by the auxiliary coil. Accordingly, at such relatively high amperage reverse currents, the device will operate substantially instantaneously.

The relative nature of the low and high amperage reverse currents are with respect to each other. The exact point at which a low amperage reverse current becomes a high amperage reverse current is determined in any particular instance by the structural characteristics and design of the device.

As stated hereinbefore, the auxiliary coil 26 is not a necessity; though it is usually preferred for reasons of economy and convenience. If the series turn 30 is provided with more turns and/or the time-delay mechanism rendered more responsive to a given magnetic flux the auxiliary coil may be eliminated.

The ultimate trip point and the current value at which practically instantaneous tripping occurs, either with or without the auxiliary coil, can be varied over a wide range of current values by varying the size of the series turn, auxiliary coil when used, and plunger return spring.

As will be seen from the diagrammatic showings of the magnetic circuit of the device, Figs. 9 and 10, the components of the circuit are so arranged that, upon normal forward current flow through the series turn, the flux of the electromagnetic portion of the circuit opposes the flux of the permanent magnetic portion, the polarity of the electromagnetic portion being similar to that of the permanent magnetic portion, see Fig. 9. However, upon reverse current flow through the series turn, the flux of the electromagnetic portion coincides in direction with the flux of the permanent magnetic portion, so that the latter is by-passed through the electromagnetic portion rather than through the magnet shorting bar or clapper 11, see Fig. 10. The polarity of the electromagnetic portion is, here, opposite that of the permanent magnetic portion.

In instances where the device is to be employed in circuits wherein reverse current flow is not a factor, that is to say, where the flow of current is always in one direction, as, for instance, as a time-delay switch or as an ordinary overload circuit breaker, no polarizing magnet is employed in the electromagnetic portion of the circuit. If the construction is that illustrated in Figs. 1 through 10, the polarizing bar magnet 33 will be replaced by a non-magnetized bar of iron or steel or other material providing a path for magnetic flux.

Figure 11:
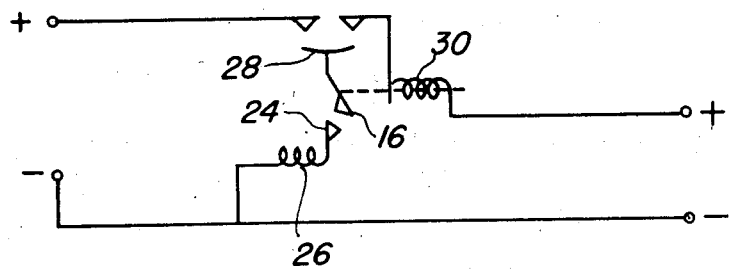
Fig. 11 is a wiring diagram illustrating the application of the invention to an ordinary overload type of circuit breaker.

In Fig. 11 is illustrated a wiring diagram of a circuit employing the device of the invention as an ordinary overload circuit breaker. The terminal connections of the device in the electrical load circuit will be as indicated. The component parts of the device are designated by the same reference characters employed in connection with the foregoing figures.

It is possible to replace the series turn by a voltage coil, in which event the device would respond to over-voltage. Likewise, it is well within the skill of the art to make the device responsive to the polarity of voltage, or to other electrical phenomena not specifically mentioned.

Whereas this invention is illustrated and described with respect to certain preferred specific embodiments thereof it should be understood that various other embodiments may be constructed on the basis of the teachings whereof by those skilled in the art, without departing from the generic scope of the invention defined by the following claims.

We claim:

1. Electro-responsive apparatus comprising: a permanent magnet of the horse-shoe type; a shorting bar of magnetic material pivoted for engagement by the poles of said permanent magnet; a spring urging said bar away from said permanent magnet with a force less than the attraction of said magnet; and an electro-magnet positioned to complete the magnetic circuit through said permanent magnet independently of said shorting bar, said electro-magnet being broken by an air gap therein; in combination with a plunger of magnetic material telescopically fitted to the end of said electro-magnet on one side of the gap therein, said plunger having a length greater than the length of the gap in said electro-magnet and being movable to make contact with the end of said electro-magnet on the other side of the gap therein to close the gap; a spring normally acting to telescope said plunger with respect to the first-named end of said electro-magnet to open the gap therein; and electrical energizing turns surrounding said electro-magnet and said plunger, whereby energization of said turns to produce polarity in said electro-magnet like that in said permanent magnet will move said plunger against the action of said spring to close the gap in said electro-magnet and will draw said shorting bar more closely to said permanent magnet, and whereby energization of said turns to produce polarity in said electro-magnet unlike that in said permanent magnet will move said plunger against action of said spring to close the gap in said electro-magnet and will release said bar by providing a flux path having lower reluctance to passage of magnetic flux.

2. Electro-responsive apparatus comprising: a permanent magnet of the horse-shoe type; a shorting bar of magnetic material pivoted for engagement by the poles of said permanent magnet; a spring urging said bar away from said permanent magnet with a force less than the attraction of said magnet; an electro-magnet positioned to complete the magnetic circuit through said permanent magnet independently of said shorting bar; said electro-magnet being broken by an air gap therein; and a cylinder fixed between the ends of said electro-magnet on each side of the gap therein to surround the gap, said cylinder confining a fluid in the gap in said electro-magnet; in combination with a plunger of magnetic material telescopically fitted to the end of said electro-magnet on one side of the gap therein, said plunger having a length greater than the length of the gap in said electro-magnet on the other side of the gap therein to close the gap, and said plunger being formed to permit restricted passage of fluid in said cylinder past said plunger as said plunger moves to open or close the gap; a spring normally acting to telescope said plunger with respect to the first-named end of said electro-magnet to open the gap therein; and electrical energizing turns surrounding said electro-magnet and said plunger, whereby energization of said turns to produce polarity in said electro-magnet like that in said permanent magnet will move said plunger against the action of said spring and the fluid in said cylinder to close the gap in said electro-magnet and will draw said bar more closely to said permanent magnet, and whereby energization of said turns to produce polarity in said electro-magnet unlike that in said permanent magnet will move said plunger against action of said spring and the fluid in said cylinder to close the gap in said electro-magnet and will release said bar by providing a flux path having lower reluctance to passage of magnetic flux.

3. Electro-responsive apparatus comprising: a permanent magnet of the horse-shoe type; a shorting bar of magnetic material pivoted for engagement by the poles of said permanent magnet; a spring urging said bar away from said permanent magnet with a force less than the attraction of said magnet; an electro-magnet positioned to complete the magnetic circuit through said permanent magnet independently of said shorting bar, said electro-magnet being broken by an air gap therein; and a polarizing magnet in the magnetic circuit of said electro-magnet to prevent magnetization thereof by current in one direction; in combination with a plunger of magnetic material telescopically fitted to the end of said electro-magnet on one side of the gap therein, said plunger having a length greater than the length of the gap in said electro-magnet and being movable to make contact with the end of said electro-magnet on the other side of the gap therein; a spring normally acting to telescope said plunger with respect to the first-named end of said electro-magnet to open the gap therein; and electrical energizing turns surrounding said electro-magnet and said plunger, whereby energization of said turns to produce polarity in said electro-magnet like that in said permanent magnet will be ineffective because of said polarizing magnet, and whereby energization of said turns to produce polarity in said electro-magnet unlike that in said permanent magnet will move said plunger against action of said spring to close the gap in said electro-magnet and will release said bar by providing a flux path having lower reluctance to passage of magnetic flux.

4. Electro-responsive apparatus comprising: a permanent magnet of the horse-shoe type; a shorting bar of magnetic material pivoted for engagement by the poles of said permanent magnet; a spring urging said bar away from said permanent magnet with a force less than the attraction of said magnet; an electro-magnet positioned to complete the magnetic circuit through said permanent magnet independently of said shorting bar; said electro-magnet being broken by an air gap therein; and a cylinder fixed between the ends of said electro-magnet on each side of the gap therein to surround the gap, said cylinder confining a fluid in the gap in said electro-magnet; in combination with a cup-shaped plunger of magnetic material telescopically fitted over the end of said electro-magnet on one side of the gap therein, said plunger having a length greater than the length of the gap in said electro-magnet and being movable to make contact with the end of said electro-magnet on the other side of the gap therein, and said plunger being formed to permit restricted passage of fluid in said cylinder past said plunger as said plunger moves to open or close the gap to provide time-delay action thereof; a spring normally acting to telescope said plunger with respect to the first-named end of said electro-magnet to open the gap therein; and electrical energizing turns surrounding said electro-magnet and said plunger, whereby energization of said turns to produce polarity in said electro-magnet like that in said permanent magnet will move said plunger against the action of said spring to close the gap in said electro-magnet and will draw said bar more closely to said permanent magnet, and whereby energization of said turns to produce polarity in said electro-magnet unlike that in said permanent magnet will move said plunger against action of said spring to close the gap in said electro-magnet and will release said bar by providing a flux path having lower reluctance to passage of magnetic flux.

5. Electro-responsive apparatus comprising: a permanent magnet of the horse-shoe type; a shorting bar of magnetic material pivoted for engagement by the poles of said permanent magnet; a spring urging said bar away from said permanent magnet with a force less than the attraction of said magnet; an electro-magnet positioned to complete the magnetic circuit through said permanent magnet independently of said shorting bar, said electro-magnet being broken by an air gap therein; and a polarizing magnet in the magnetic circuit of said electro-magnet to prevent magnetization thereof by current in one direction; in combination with a cup-shaped plunger of magnetic material telescopically fitted over the end of said electro-magnet on one side of the gap therein, said plunger having a length greater than the length of the gap in said electro-magnet and being movable to make contact with the end of said electro-magnet on the other side of the gap therein; a spring normally acting to telescope said plunger with respect to the first-named end of said electro-magnet to open the gap therein; and electrical energizing turns surrounding said electro-magnet and said plunger, whereby energization of said turns to produce polarity in said electro-magnet like that in said permanent magnet will be ineffective because of said polarizing magnet, and whereby energization of said turns to produce polarity in said electro-magnet unlike that in said permanent magnet will move said plunger against action of said spring to close the gap in said electro-magnet and will release said bar by providing a flux path having lower reluctance to passage of magnetic flux.

6. Electro-responsive apparatus comprising: a permanent magnet of the horse-shoe type; a shorting bar of magnetic material pivoted for engagement by the poles of said permanent magnet; a spring urging said bar away from said permanent magnet with a force less than the attraction of said magnet; an electro-magnet positioned to complete the magnetic circuit through said permanent magnet independently of said shorting bar; said electro-magnet being broken by an air gap therein; a polarizing magnet in the magnetic circuit of said electro-magnet to prevent magnetization thereof by current in one direction; and a cylinder fixed between the ends of said electro-magnet on each side of the gap therein to surround the gap, said cylinder confining a fluid in the gap in said electro-magnet; in combination with a cup-shaped plunger of magnetic material telescopically fitted over the end of said electro-magnet on one side of the gap therein, said plunger having a length greater than the length of the gap in said electro-magnet and being movable to make contact with the end of said electro-magnet on the other side of the gap therein and said plunger being formed to permit restricted passage of fluid in said cylinder past said plunger as said plunger moves to open or close the gap to provide time-delay action thereof; a spring normally acting to telescope said plunger with respect to the first-named end of said electro-magnet to open the gap therein; electrical energizing turns surrounding said electro-magnet and said plunger; an auxiliary coil surrounding said electro-magnet to augment the flux therein; and contacts for closing the circuit through said auxiliary coil positioned to be closed by said plunger upon closing the gap in said electro-magnet; whereby energization of said turns to produce polarity in said electro-magnet like that in said permanent magnet will be ineffective because of said polarizing magnet, and whereby energization of said turns to produce polarity in said electro-magnet unlike that in said permanent magnet will move said plunger against action of said spring to close the gap in said electro-magnet and will release said bar by providing a flux path having lower reluctance to passage of magnetic flux.

JOSEPH F. O'BRIEN.
EMIL PODHORZER.

REFERENCES CITED

The following references are of record in the file of this patent:

UNITED STATES PATENTS

| Number | Name | Date |
|---|---|---|
| 751,442 | Andrews | Feb. 9, 1904 |
| 1,154,359 | Basch | Sept. 21, 1915 |
| 1,822,496 | Lazich | Sept. 8, 1931 |
| 1,947,236 | Walle | Feb. 13, 1934 |
| 2,432,581 | Miller | Dec. 16, 1947 |